(12) United States Patent
McKaigue et al.

(10) Patent No.: US 10,012,339 B2
(45) Date of Patent: Jul. 3, 2018

(54) LINER REMOVAL SYSTEM

(71) Applicant: FER-PAL CONSTRUCTION LTD., North York (CA)

(72) Inventors: Kendrick Shaun McKaigue, Gilford (CA); Vadim Kosseniouk, Richmond Hill (CA)

(73) Assignee: FER-PAL CONSTRUCTION, LTD., Ontario (CA)

( * ) Notice: Subject to any disclaimer, the term of this patent is extended or adjusted under 35 U.S.C. 154(b) by 49 days.

(21) Appl. No.: 15/199,397

(22) Filed: Jun. 30, 2016

(65) Prior Publication Data

US 2017/0002970 A1 Jan. 5, 2017

Related U.S. Application Data

(60) Provisional application No. 62/187,736, filed on Jul. 1, 2015.

(51) Int. Cl.
*F16L 55/18* (2006.01)
*B08B 9/043* (2006.01)
*B08B 9/045* (2006.01)

(52) U.S. Cl.
CPC ............. *F16L 55/18* (2013.01); *B08B 9/045* (2013.01); *B08B 9/0436* (2013.01)

(58) Field of Classification Search
CPC combination set(s) only.
See application file for complete search history.

(56) References Cited

U.S. PATENT DOCUMENTS

| | | | |
|---|---|---|---|
| 812,361 A | 2/1906 | Pickles | |
| 1,608,347 A | 2/1925 | Thompson et al. | |
| 1,717,986 A * | 6/1929 | Liebau | B08B 9/0497 |
| | | | 15/104.12 |
| 2,328,093 A | 8/1943 | Osborn et al. | |
| 2,972,156 A | 2/1961 | Ver | |
| 3,525,111 A | 8/1970 | von Arx | |
| 4,573,231 A | 3/1986 | Stocksiefen | |
| 4,891,115 A | 1/1990 | Shishkin et al. | |
| 4,920,600 A | 5/1990 | Reinhart | |
| 5,617,604 A | 4/1997 | Erich | |
| 6,368,418 B1 | 4/2002 | Rowe | |
| 7,971,307 B2 | 7/2011 | Chow | |
| 8,011,052 B2 | 9/2011 | Kapustin | |
| 8,407,844 B2 | 4/2013 | Boe | |
| 2005/0028306 A1 * | 2/2005 | Bergstrom | B08B 7/02 |
| | | | 15/104.31 |
| 2010/0139019 A1 | 6/2010 | Geppert et al. | |

FOREIGN PATENT DOCUMENTS

JP S5645358 4/1981

* cited by examiner

*Primary Examiner* — Kyle Armstrong
(74) *Attorney, Agent, or Firm* — Kramer Amado, P.C.

(57) ABSTRACT

A system for removing structural liners (whether cured-in-place liners or cement-mortar liners) from a dry conduit is disclosed. The system uses a set of cutters of progressively larger diameters, front and rear supports designed for this purpose, and a drive means for driving the system down the conduit where the structural liner is to be removed.

1 Claim, 11 Drawing Sheets

LINER REMOVAL SYSTEM

FIELD OF THE INVENTION

This invention relates to a device for the removal of structural liners from a conduit, such as a water or sewage conduits or gas or chemical pipes. The device can also be used to generally remove difficult in-pipe obstacles.

BACKGROUND

Conduits for fluids, such as water or sewage conduits, or gas or chemical pipe, deteriorate over time. For example, many of the water mains throughout North America are made from unlined cast-iron pipe, the preferred material for water distribution systems up to the mid-1970's and beyond. Over time such pipes will deteriorate, often due to corrosion, becoming pitted and forming tubercules. This corroded material, in combination with mineral deposits, is known as encrustation and tuberculation.

Such deterioration results in leakage of the fluids, such as water or sewage, into the surrounding environment. For example, in 2013, Toronto experienced approximately 1700 water main breaks. These cause drops water pressure drops, and the leaking fluids can weaken the surrounding ground and can interfere with other underground systems, such as communication systems or other water or fluid bearing conduits. Such conduits need to be rehabilitated.

One approach to rehabilitation is to replace the deteriorated conduit. However, this can be a very costly and labour-intensive exercise; for example, if the conduit is a buried water pipe, replacement involves setting up a work area and digging up the pipe, known as "open-cut replacement".

A different approach to rehabilitation is to re-line the walls of the conduit, which can be performed without digging up or accessing the exterior of the conduit itself. In the water conduit rehabilitation sector, this is known as "trenchless technology". In doing so, a "structural liner" is formed; put simply, a new pipe or conduit (or inner surface) is formed inside the old conduit. As a first step, it is usual for the conduit to be cleaned to remove debris, which can includes encrustation and tuberculation in the case of water conduits, but more generally can also include dust, grease and sludge.

The inside of the conduit is then lined. Two approaches are cured-in-place pipe and a cement-mortar lining.

Cement-mortar lining, also known as a spray-on liner, involves a cement mortar that is sprayed onto the inside of the conduit, sealing any leakages and so extending the useful life of the conduit. The spray is applied when the conduit is not in service, and is relatively dry.

Another solution is to deploy a cured-in-place structural liner within the conduit. For example, Canadian patent no. 2,361,960 of Mercier describes the use of a cured-in-place structural liner. The liner consists of two concentric tubular jackets (an outer and an inner jacket) made of a flexible material that are impregnated with an adhesive resin. Bonded to the inner surface of the inner jacket is a film that is impermeable to liquid to flow through the conduit. The liner is inserted into one end of a dry conduit and then pulled into place. A shaping step then occurs, where the liner is made to conform to the inner wall of the conduit. The liner is then cured in place by flowing heated water through the conduit. This causes the liner to become a rigid structure, bonded to the inner surface of the conduit.

In one example, such an approach results in a conduit lined with a polyurethane and fabric liner, typically 1/16 to 1/4 of an inch thick, which is sealed in place with epoxy.

However, if the structural liner (whether a cured-in-place structural liner or a cement-mortar liner or another structural liner) is defective or improperly installed, it may need to be removed soon after installation. If the liner is misapplied or poorly applied (for example due to equipment failure, poor epoxy quality due to mix ratio and temperature), it may deform over time and may need to be removed in the medium term. Furthermore, in the long run structural liners themselves will deteriorate and need to be replaced. This will involve removing the installed liner.

There do exist devices or systems designed to clean conduits prior to liner installation. For example, U.S. Pat. No. 3,525,111 of Von Arx shows a device for treating the inner surface of a cylindrical duct, including rotating sets of arms. The arms may be equipped with bristles, scrapers, abrasives or paint applicators. The arms are rotated through use of a turbine when the device is towed through a fluid, or can be rotated by an electric or air motor. This device has at least two sets of rotating arms that rotate in opposite directions to reduce the impact of internal discontinuities in the pipe (such as rivet heads) on the desired treatment. U.S. Pat. No. 8,407,844 of Boe discloses a "pig" or device that moves through a pipe, powered by the flow of fluid in the pipe via a turbine, which may be used for cleaning. The tools in this device (for example, brushes or scrapers) may be powered by the turbine or by a power source such as a battery. U.S. Pat. No. 6,368,418 of Rowe discloses a device driven by water pressure in the conduit to move the device and rotate a disk with a serrated edge. U.S. Pat. No. 4,573,231 of Stockstein et al. also discloses a device driven by the water pressure in a conduit and driving a set of cutting wheels using a collar and impact shaft system. In another approach, U.S. Pat. No. 8,011,052 of Kapustin discloses a cleaning device that is designed to be towed by a pig towing device.

These approaches are designed to remove encrustation, tuberculation, or debris in the conduit. However, the removal of structural liners, including cured-in-place pipe and cement-mortar linings, presents a different problem than the scraping of deposits in the preparation for a lining.

Compared to encrustation, tuberculation, or debris, structural liners are generally harder, smoother, more strongly attached to the walls of the conduit, and broadly attached to the inner surface of the conduit. Although there may be deposits encountered in a conduit during cleaning that are hard, or smooth, or bonded to the inner walls of the conduit, such deposits are limited. In contrast, liners extend for the entire length and circumference of the conduit.

Generally, the prior art approaches to conduit cleaning provide cleaners with limited cutting and grinding power, often driven by turbines, or electric or air motors. For example, U.S. Pat. No. 6,368,418 of Rowe states that the device may need to be passed through a pipe several times for adequate cleaning of the pipe when removing deposits. Generally, these are either pushed through the conduit by differences in fluid pressure or are towed. Also, in practice rehabilitation of conduits using structural liners are performed using a dry pipe, while the devices listed above are often designed to work in a fluid environment.

In light of this, it would be advantageous to have a device for removing structural liners (whether cured-in-place liners or cement-mortar liners) from a dry conduit.

SUMMARY

The inventive device addresses the issue of the removal of structural liners from conduits by providing a device with greater cutting and grinding power, sized close to the diameter of the original conduit (or more generally, to the desired geometry of the conduit after completion of the removal of the liner) so as to be akin to milling the conduit, and a structure that can control the cutting and grinding apparatus in the axial centre of the pipe, given the torque and vibrations necessarily caused by sufficiently powerful cutting and grinding activity.

Conduits will often have service connections tied into the conduit. These service connections will often protrude into the conduit itself; in other words, they will protrude beyond the inner surface of the conduit. Since structural liners (whether cured-in-place or cement-mortar liners) cover the inner surface of the conduit, removal of the liner once it has hardened as a practical matter may require removal of the portion of the service connection protruding into the conduit. The portions of the service connections protruding into the conduits are often made of brass or copper. Generally, the prior art approaches to conduit cleaning provide cleaners with limited cutting and grinding power, often driven by turbines, and are not designed to remove such difficult in-pipe obstacles from conduits such as brass or copper protrusions into the conduit. Also, the structural liner itself may be deformed, possibly presenting difficulties in the shape of the deformity that are different from encrustation and tuberculation. The present device is capable of removing such difficult in-pipe obstacles.

Although the device is designed for the removal of liners, necessarily including the removal of intruding service connections or deformed liners, it can also be used for the removal of other difficult in-pipe obstacles that may be encountered. Furthermore, in the past, pipes were often connected using lead. Government regulations now require these connections to be ground down to minimize contamination of lead into the water conveyed through the pipe. The present device also can be used to grind down such lead connections between pipes.

In addition to removing the previous liner, the inventive device also controls the geometry of the conduit after the completion of the liner removal process. Generally, the inside diameter of the conduit after liner removal will be consistent through the length of the conduit within the designed tolerances, and ready for future treatment. The devices in the prior art discussed previously are not designed to deliver the desired geometry, consistency and smoothness after their cleaning actions, and would not deliver the desired geometry, consistency and smoothness if one attempted to use them to remove a hardened structural liner.

In accordance with the present invention, there is provided an an apparatus for removing a liner from a generally cylindrical conduit, comprising, a front support axially displaceable inside a conduit provided with a first guide means engagable with the inner periphery of said conduit; a shaft extending axially from said front support; a rear support axially displaceable inside a conduit supporting said shaft provided with a second guide means engageable with the inner periphery of said conduit; a set of cutters mounted on said shaft for rotation about the axis of said conduit and mounted between said front support and said rear support; drive means for rotating said set of cutters about said axis and pushing said shaft down the conduit where the drive means provides at least 1000 ft lbs of torque; and at least one third support for the shaft located between said driver and said rear support.

In another aspect of the present invention, the set of cutters consists of at least two cutters of progressively larger diameter. In another aspect of the present invention, the at least two cutters are circular cutters equipped with carbide tips. In another aspect of the present invention, the at least two cutters include cutouts positioned to allow debris to move axially up behind the at least two cutters. In another aspect of the present invention, the at least one third supports are slidable in the axial direction of the conduit. In another aspect of the present invention, the shaft comprises a connected series of push rods. In another aspect of the present invention, the rear support includes at least three spring-loaded rollers oriented radially to the axis of the conduit. In another aspect of the present invention, the spring-loaded rollers include wheels oriented axially down the pipe.

In another aspect of the present invention, the front support comprises at least three collapsible supports oriented radially to the axis of the conduit, said collapsible supports being attached to a sliding ring, said sliding ring being biased by a biasing means to extend said collapsible supports. In another aspect of the present invention, said biasing means is a spring. In another aspect of the present invention, the three collapsible supports have greater radial flexibility than the at least three spring-loaded rollers.

In accordance with the present invention, there is provided a method of removing a liner from a conduit, comprising: a) Introducing the apparatus of claims 1 to 11 into a conduit; and b) engaging said motor and driving said shaft into said conduit. In another aspect of the present invention, there is provided the further steps of: c) At a predetermined point, disengaging said motor, interposing a push rod between said shaft and said motor; and d) repeating step b).

BRIEF DESCRIPTION OF THE DRAWINGS

The embodiments of the present invention shall be more clearly understood with reference to the following detail description of the embodiments of the invention taken in conjunction with the accompanying drawings, in which.

DETAILED DESCRIPTION

The description which follows and the embodiments described therein are provided by way of illustration of an example, or examples of particular embodiments of the principles and aspects of the present invention. These examples are provided for the purposes of explanation and not of limitation, of those principles of the invention. In the description that follows, like parts are marked throughout the specification and the drawings with the same respective reference numerals.

Figure 1:
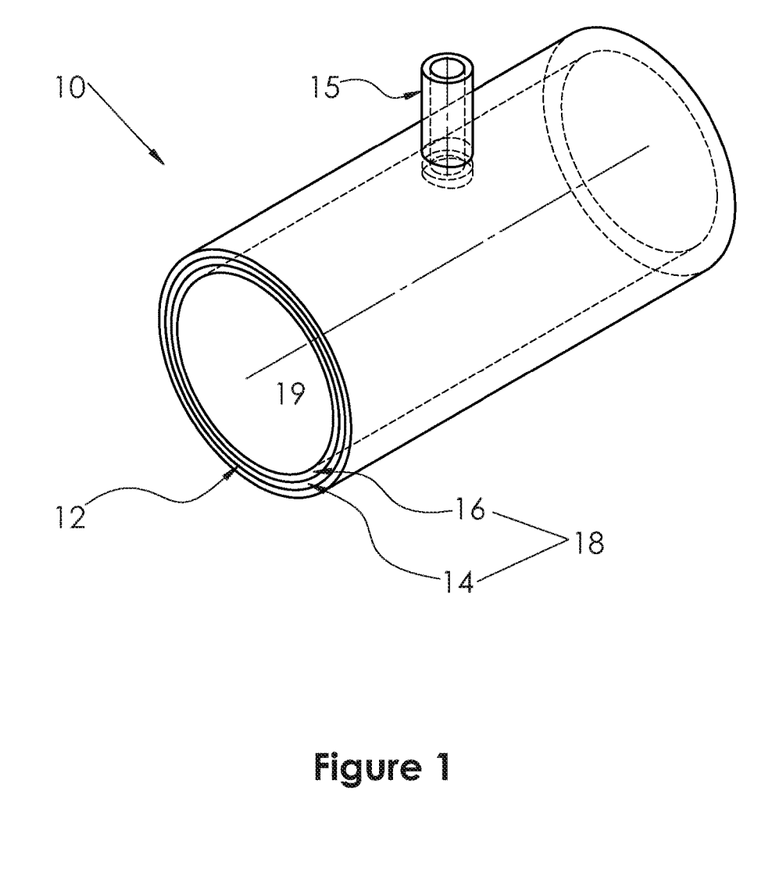
FIG. 1 is a perspective view of a conduit, shown with the inner wall covered with a two-layer liner in accord with the approach of Mercer.

FIG. 1 shows a conduit or pipe 10. Conduit 10 has an inside surface 12. In this example, the conduit 10 has been lined with a cured-in-place structural liner using a method generally described in Canadian patent no. 2,361,960 of Mercer: bonded to the inside surface 12 is an outer jacket 14 and an inner jacket 16 which together constitute a structural liner 18. The outer jacket 14 may be made from woven polyester of about 2 mm thickness and the inner jacket 16 from woven polyester of about 2-2.5 mm thickness. Outer jacket 14 and inner jacket 16 are impregnated with epoxy, which is then cured to form a hard material. Outer jacket 14 is bonded by the epoxy to inside surface 12; inner jacket 16 is bonded by epoxy to outer jacket 14. The inner liner surface 19 of inner jacket 16 is smooth and hard. Inner liner surface 19 should be impermeable to the fluid that will flow through the conduit, and to the epoxy. Inner liner surface 19 can be made of polyurethane. Generally, the method of Mercer is used to rehabilitate water conduits, and inner liner surface 19 is impermeable to water.

Figure 2:
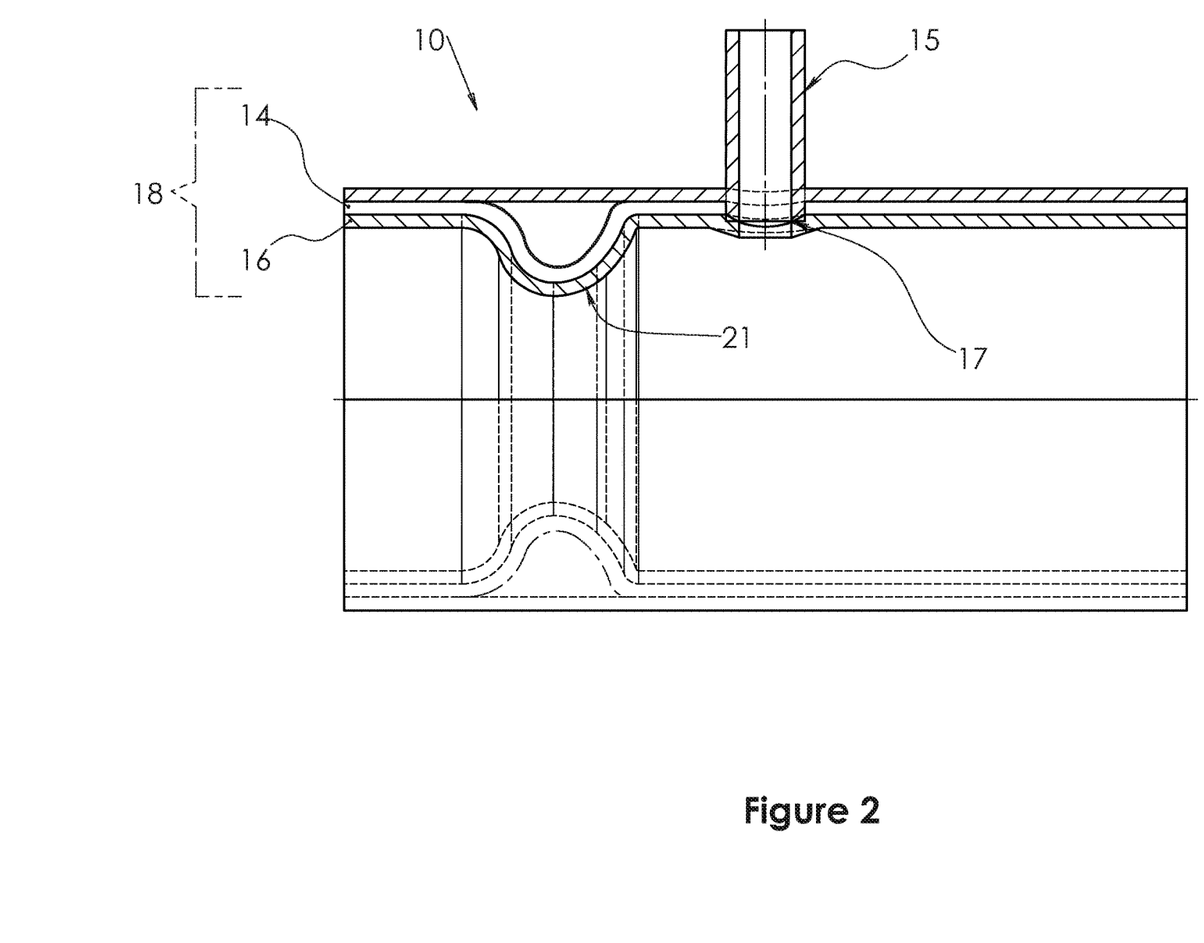
FIG. 2 is a side view of a conduit, showing an intruding service connection and a misapplied cure-in-pipe structural liner.

Conduit 10 is connected to a service connection 15. If service connection 15 intrudes into the pipe, it will form an obstacle to the removal of the structural liner 18. Deformities in the installed liner 18 will also present difficulties in the removal of the liner. FIG. 2 is a side view of the conduit of FIG. 1 with an intrusion 17 from service connection 15 and a deformation 21 in the structural liner 18.

Figure 3:
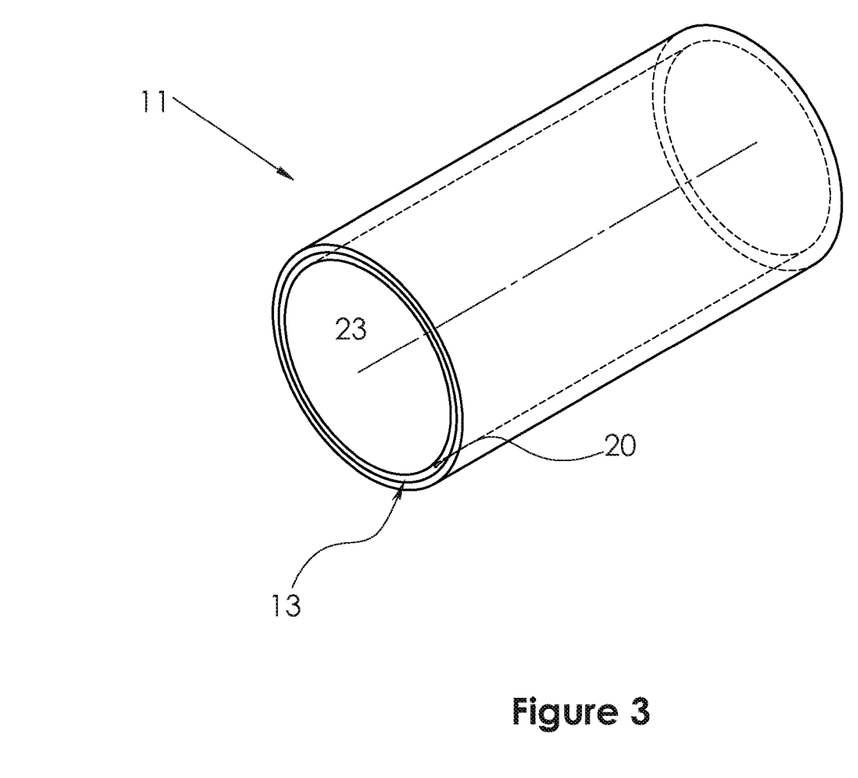
FIG. 3 is a perspective view of conduit, shown with the inner wall covered with a spray-on concrete liner.

Conduits may also be rehabilitated with a cement-mortar liner. FIG. 3 shows a second conduit 11 with an inside surface 13. Conduit 11 has been lined with a spray-on cement-mortar liner 20. Liner 20 is one layer of cement mortar. In this case, cement-mortar liner 20 is bonded to inside surface 13. Liner 20 is hard, difficult to crumble or break and has a smooth inner liner surface 23. This approach is used in conduits for transporting water, and in such cases the inner liner surface 23 is impermeable to water. More generally, inner liner surface 23 should be impermeable to the fluids to flow in conduit 11; in the case of rehabilitating water conduits, inner liner surface 23 is impermeable to water.

Figure 4:
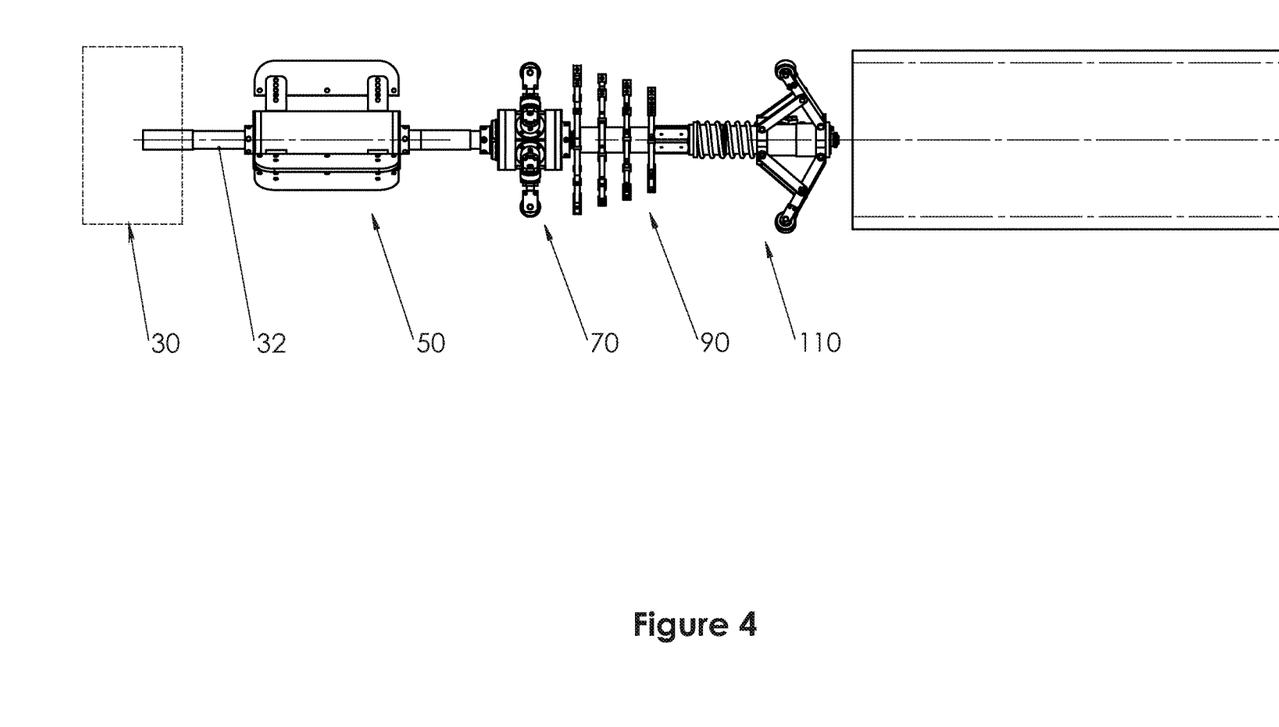
FIG. 4 illustrates an overview of the liner removal system.

Turning to FIG. 4, the liner removal system generally consists of a driver 30, rear slide supports 50, rear rollers support 70, cutters 90, and front support 110. Driver 30 turns a shaft 32, which turns cutters 90.

Figure 5:
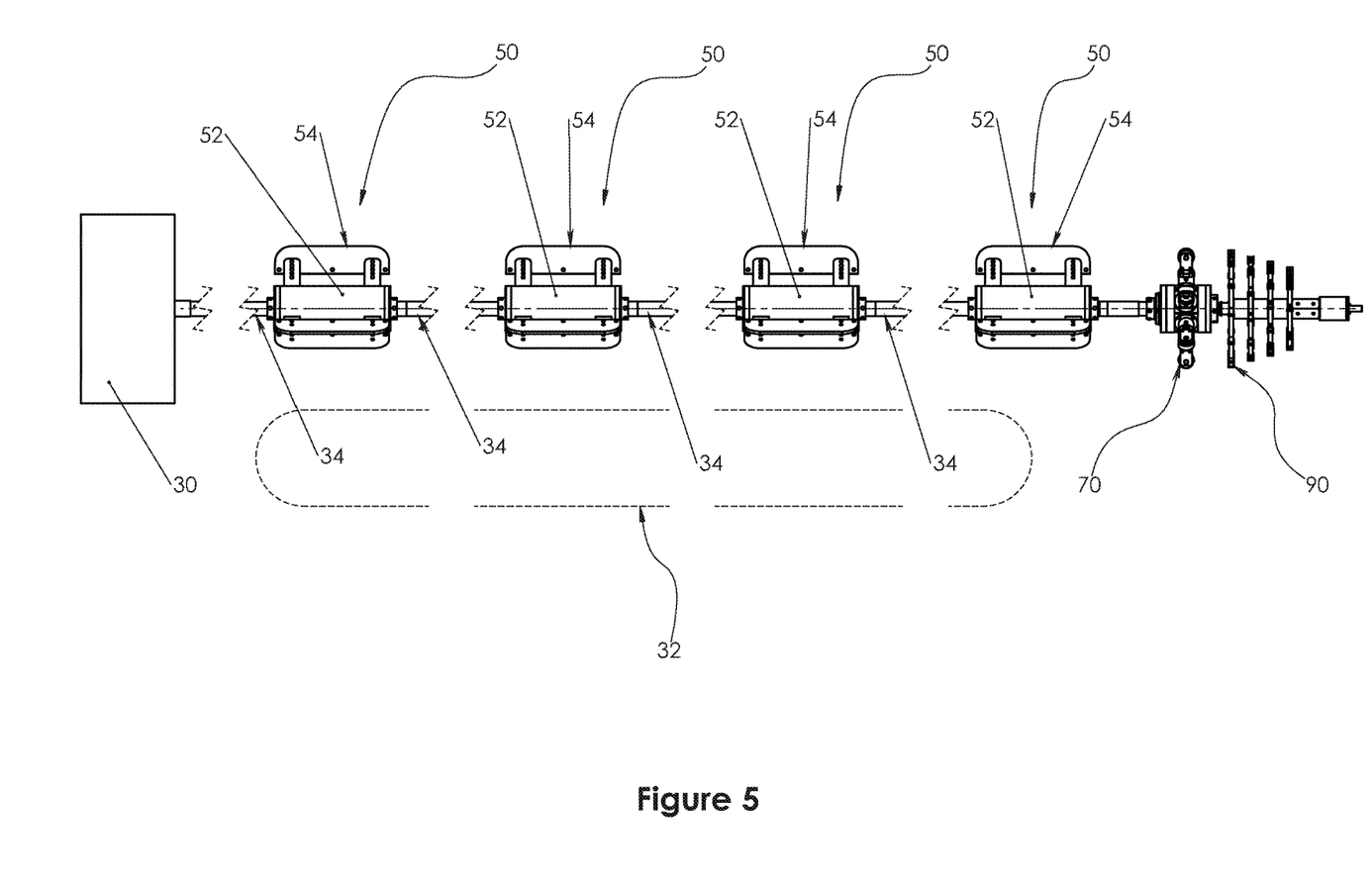
FIG. 5 illustrates the driver and the rear slide support.

Turning to FIG. 5, driver 30 is connected to a push rod 34. Shaft 32 is a series of connected push rods 34. The push rods 34 may be connected in any way known in the art as long as the connection accommodates rotation in both directions. Driver 30 is a driver that provides sufficient torque and thrust to grind out a structural liner and push the liner removal system down the conduit. A driver 30 that provides 1,000 ft lbs of torque and 17,670 lbs of thrust has been found to work for cured-in-place structural liners.

Figure 6:
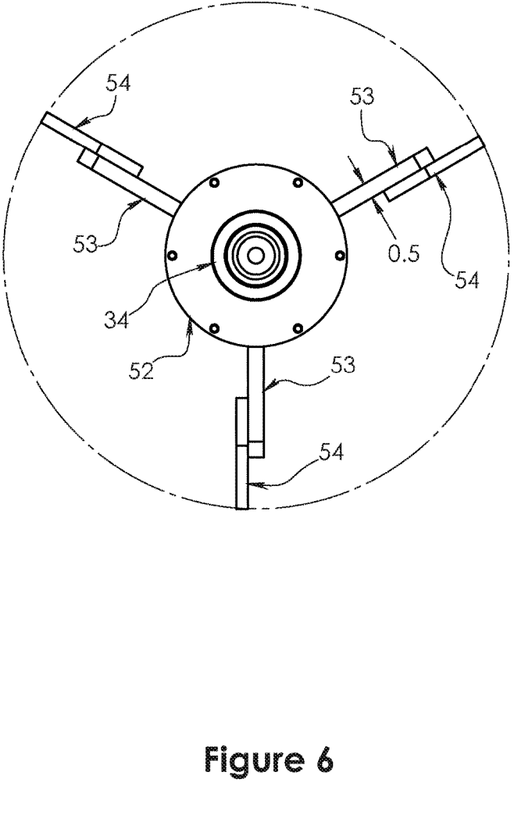
FIG. 6 is an axial view of the rear slide support.

Turning to FIG. 6, the rear slide supports are a central tube 52 built around a push rod 34, and have three fins 54 spaced equally spaced around the central tube. The central tube includes ball bearings that allow the push rods to rotate while rear slide supports 50 do not. The radial length of the fins is set to reflect the diameter of the conduit. The fins 54 are held by a holder bracket 53 and are adjusted radially by holder brackets 53 with a locking pin system. In this embodiment, a rear slide support in inserted every 20 meters.

Rear slide supports 50 guide shaft 32 (and thus push rods 34) and keep the shaft 32 in the center of the conduit. Rear slide supports 50 consist of a central tube 52 and three radially spaced fins 54; the radially spaced fins are sized to keeps the axis of the shaft 32 aligned with the pipe. Driver 30 turns the shaft 32 and cutters 90, and also pushes the shaft 32 and the rest of the liner removal system down the conduit. Once the liner removal system has progressed a certain distance down the conduit, the driver is stopped and reset, and a new push rod 34 is added. More rear slide supports 50 and push rods 34 are added as the device moves into the pipe.

Figure 7:
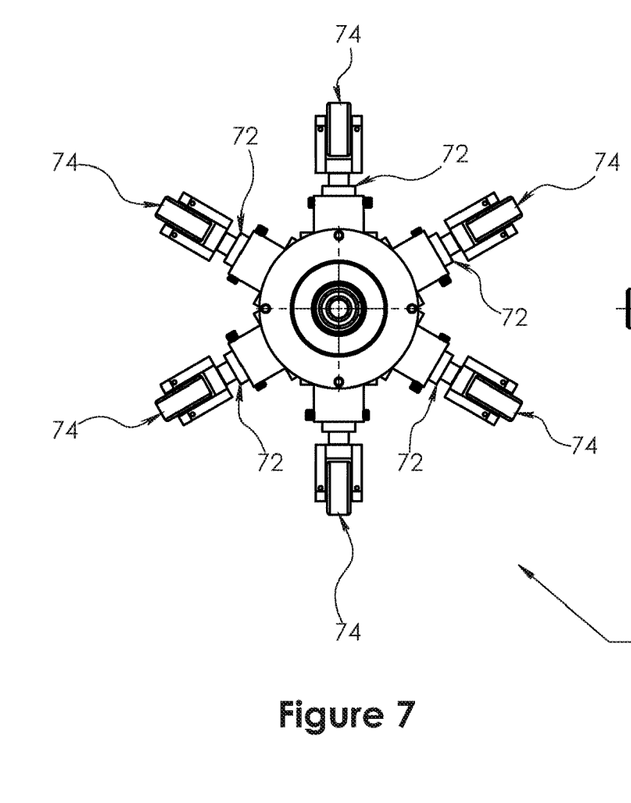
FIG. 7 is an axial view of the rear rollers support.
Figure 8:
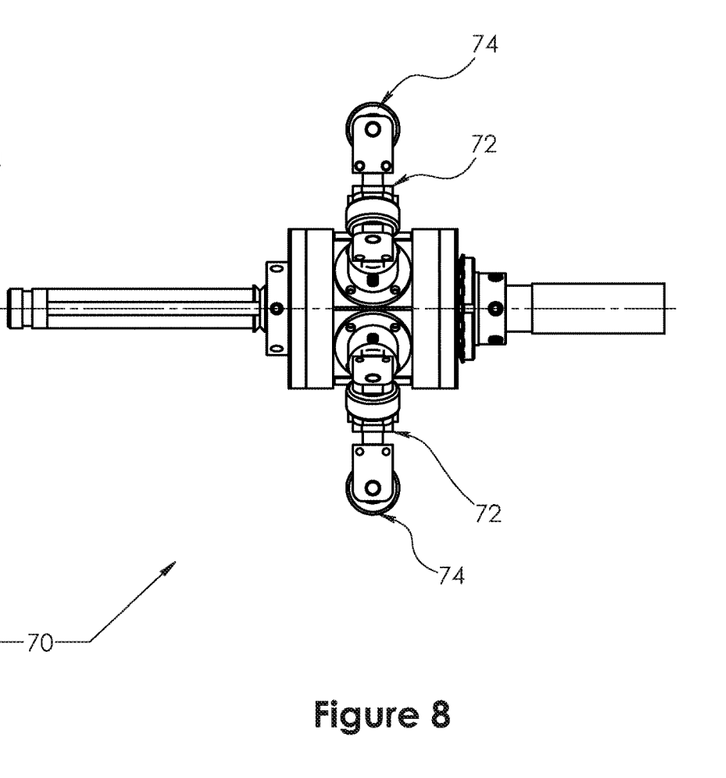
FIG. 8 is a side view of the rear rollers support.

The rear rollers support 70 keeps cutters 90 in the centre of the pipe, and compensates for uneven pipe surfaces and diameter variations when going through the pipe. Turning to FIGS. 7 and 8, Rear rollers support 70 includes spring loaded rollers 72 with wheels 74. The wheels 74 are oriented down the axis of the pipe (i.e. perpendicular to the rotation of the shaft 32 and cutters 90). The spring loaded rollers 72 are adjusted to the diameter of the conduit, and the springs bias the wheels 74 outwards so the wheels contact the inner surface of the conduit. The spring loaded rollers 72 can adjust to uneven surfaces in the newly ground pipe.

Figure 9:
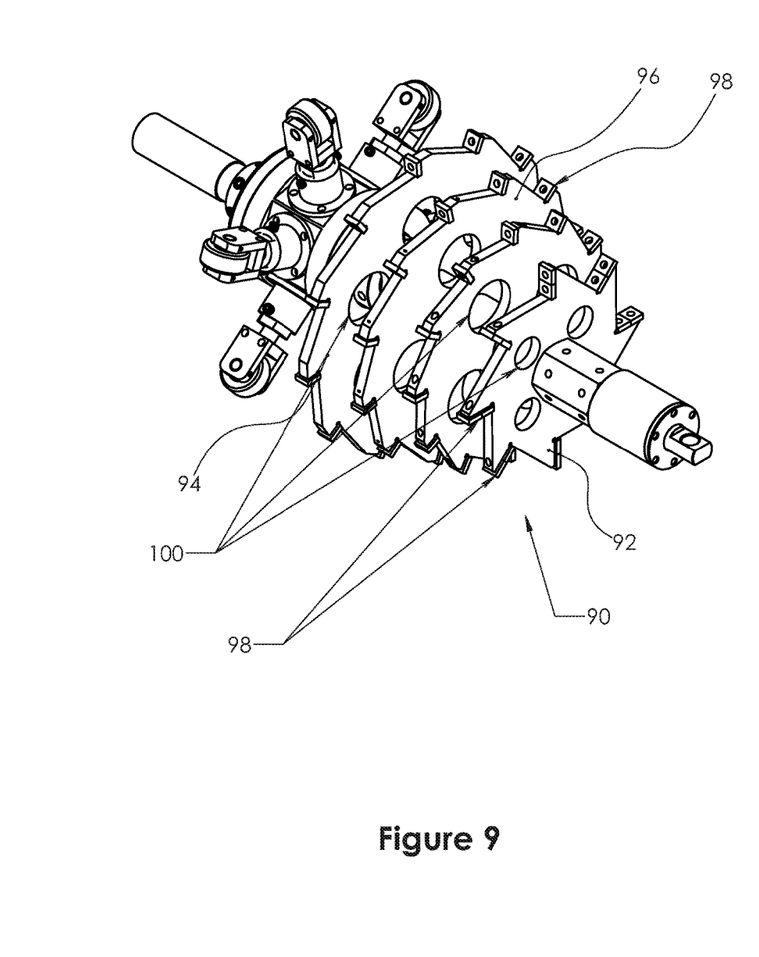
FIG. 9 is a front perspective view of the cutters.
Figure 10:
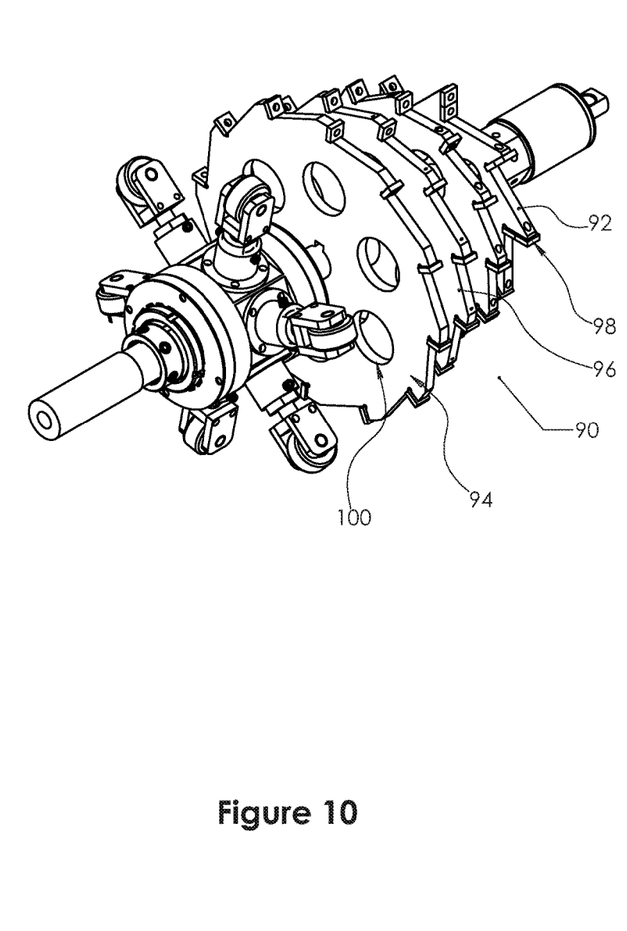
FIG. 10 is a rear perspective view of the cutters.
Figure 11:
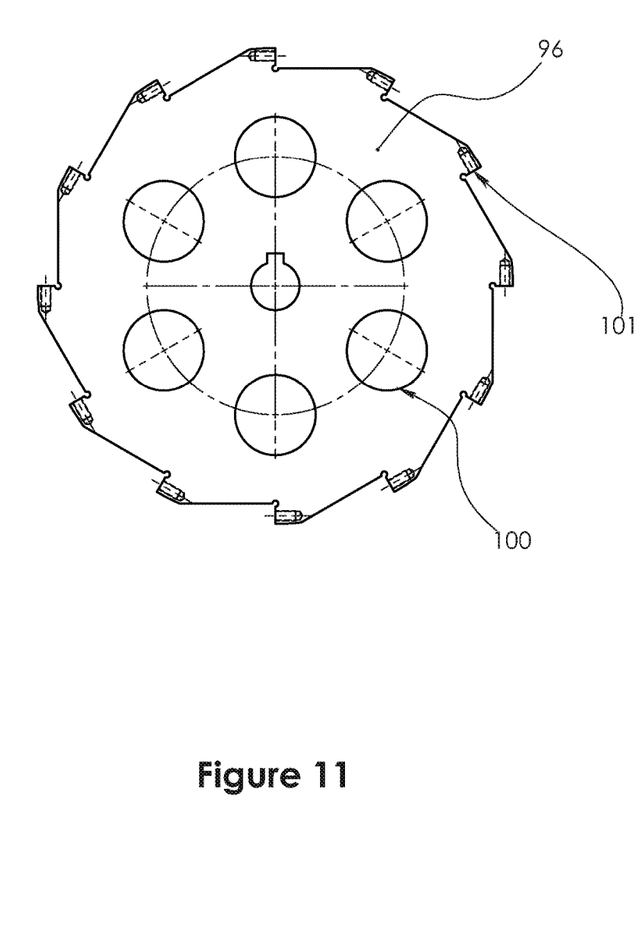
FIG. 11 is an axial view of a cutter wheel.

The set of cutters 90 may be seen in FIGS. 9 and 10. These are a set of cutters of increasing diameter from smallest cutter 92 to largest cutter 94. The largest cutter 94 is sized to achieve the desired largest diameter of grinding. The cutter wheels 96 and cutting tips 98 must be made out of a material suitable to cut and grind the liner being removed. The cutter wheels 96 may be seen in a side view in FIG. 11. The cutters include cutouts 100 which allow the passage of debris from the grinding to the back of the device and eventually our behind the rear rollers support 70. The cutouts 100 must be large enough to allow the passage of chunks of liner being removed. The necessary size of cutouts 100 depends upon the nature of the liner being ground. Generally, it is desirable to make the cutouts 100 as large as possible; however, in practice a diameter of 2 inches has been found to be adequate for both spray-on cement-mortar liners and cured-in-place structural liners. Cutter wheels 96 have notches 101 to accept cutting tips 98.

Figure 12:
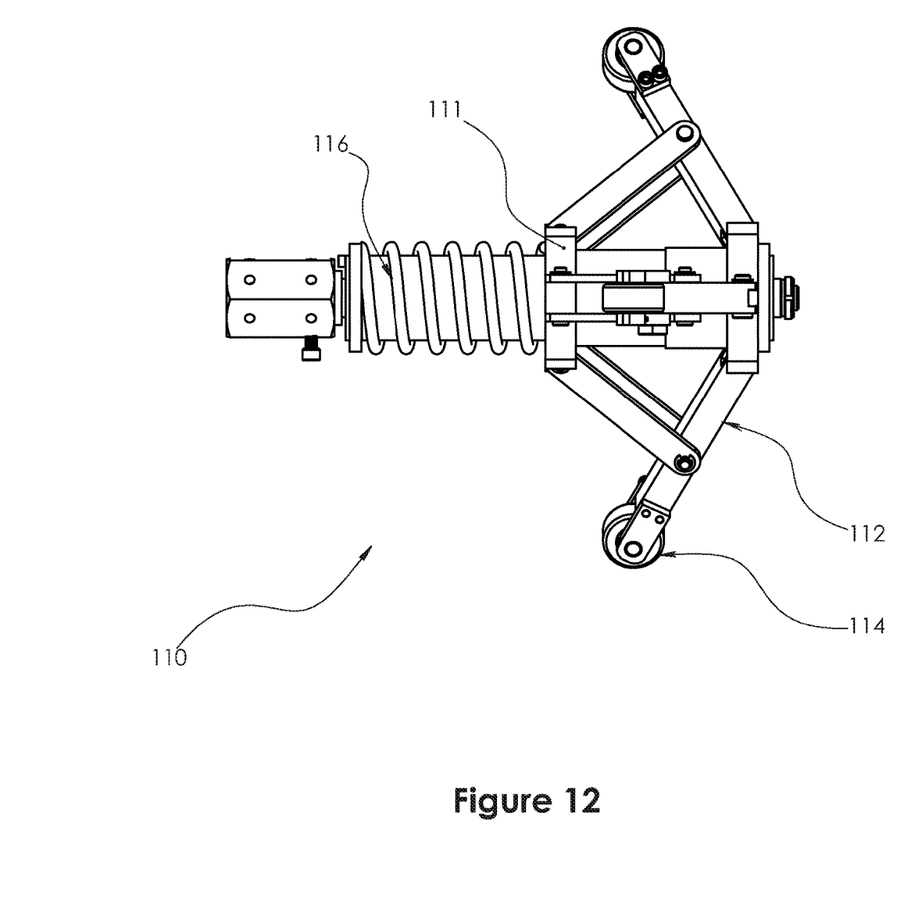
FIG. 12 is a side view of the front support.

FIG. 12 shows the front support 110. Front support 110 includes collapsible supports 112, with wheels 114 oriented axially down the pipe (i.e. perpendicular to the rotation of shaft 32 and cutters 90). The collapsible supports 112 are attached to a sliding ring 111, which is biased forward (in the direction of the drilling) by spring 116. The collapsible supports 112 allow the device to handle uneven bumps and other obstacles in the pipe.

Figure 13:
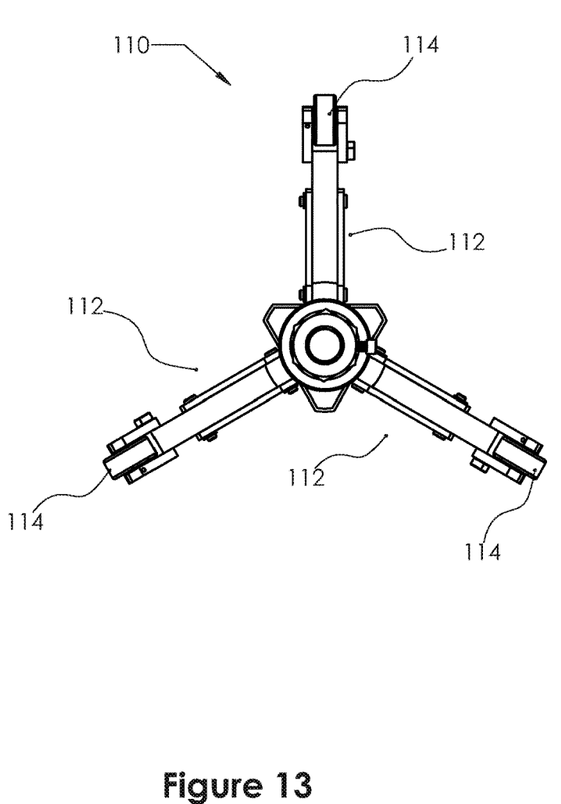
FIG. 13 is an axial view of the front support.
Figure 14:
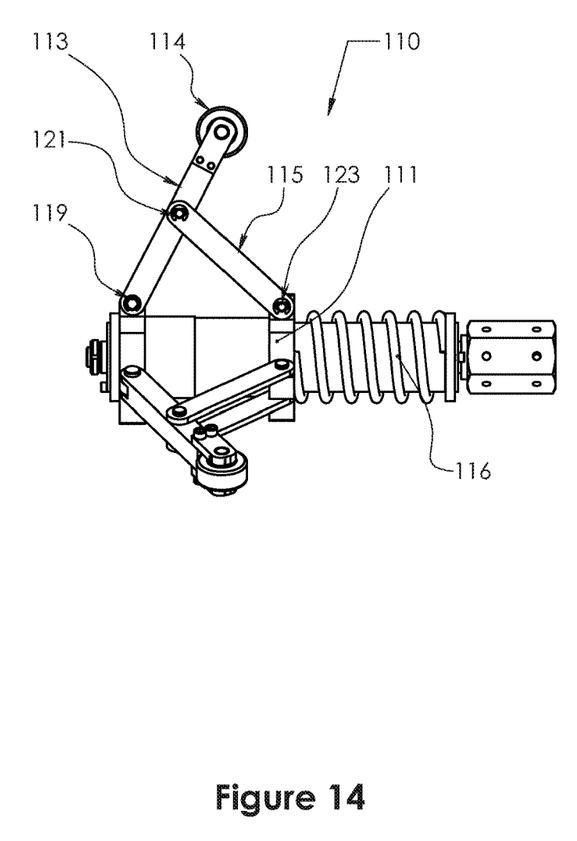
FIG. 14 is a side view of the front support.

The front support 110 uses ball bearings to allow the shaft 32 to rotate independent of the front support 110. Turning to FIG. 13, the three collapsible supports 112 are axially spaced around the front support 110. Turning to FIG. 14, the collapsible supports 112 consist of a first member 113 (attached to wheel 114) and a second member 115 is rotationally connected at 121. First member 113 is rotationally attached to the front support 110 at 119, while the second member is rotationally attached to sliding ring 111 at 123.

Rear rollers support 70, cutters 90 and front support 110 and shaft 32 and driver 30 work together as a system to grind out a liner. The system is introduced into a conduit from which a liner is to be removed. Front support 110 is the foremost component in the direction of cutting, and is flexible enough to maneuver past irregularities in the liner (as would happen for example with an improperly installed structural liner 18, or in the case of a service connection protruding into the conduit) while keeping the cutters 90 centered in the conduit.

Driver 30 pushes the liner removal system into the conduit. If there is an irregularity in the liner, the liner will first be cut by one of the smaller cutters 90, and as the cutter is moved forward it encounters progressively larger cutters until it encounters largest cutter 94. Since the liner (whether a structural liner 18 or a sprayed on concrete liner) is bonded to the inside surface 12 of the conduit 10, the diameter of largest cutter 94 needs to be close to the diameter of conduit 10 in order to remove the liner (without damaging the host pipe) and render the pipe suitable for further rehabilitation. In this way, the cutters 90 are performing an action more akin to milling the conduit than merely scraping out debris.

When removing a cured-in-place structural liner in preparation for rehabilitating the conduit by installing a new cured-in-place structural liner, it is important to remove the woven polyester (although a small amount of epoxy is acceptable). Also, one would want the inner surface of the conduit to be as round as possible to avoid voids when installing the new liner. If the conduit narrows or not circular, the liner material may bunch up or fold. While a small fold in the liner is desirable as it ensures that liner is contacting the conduit through the entire circumference of the conduit, too large of a fold is undesirable. Debris will accumulate around a fold, and if the fold is too large it can cause turbulence such a bubbling in the water as if passes through the conduit, which can result in contamination of the water. Also, if the fold is not consistent (i.e. a spiral) then the water starts to turbulate, creating vibration in the conduit itself, which increases the speed of deterioration. Also, if the fold is located above a service, it may be impossible to drill the service out (i.e. drill the structural liner to allow the service access to the conduit).

Rear rollers support 70 encounter a different operating environment than front support 110, since the liner will have already been cut and ground from the conduit ahead of rear rollers 70. As a result, the spring loaded rollers 72 should be stiffer than spring 116, and rear roller support 70 acts to keep the cutters 90 centered in the conduit.

If the conduit is of sufficient length, once the liner removal system has progressed a predetermined distance down the conduit, the driver 30 is stopped and reset, and a push rod 34 is added, typically with a rear slide support 50. The driver 30 is engaged, disengaged and reset, and more rear slide supports 50 and push rods 34 are added, as the device moves into the conduit.

In one embodiment of the invention, the driver 30 is powered by a diesel or gas motor. In one embodiment of the invention, driver 30 is a McLaughlin Boring System model MCL-10H, which can provide more than 1,000 ft lbs of torque and 17,670 lbs of thrust. Push rods 34 are steel, 2 inches in diameter, about 24 inches long, and have a central channel ½ inch in diameter which allows for more flexibility and handling of the torque. The push rods 34 are connected by a conical thread to create shaft 32. The fins 54 are 3.5 inches by 14.5 inches by ⅜ inch stainless steel and are held by a holder bracket 53 with a locking pin system covering about 3.0 inches in adjustment. The holder bracket 53 extends radially about 3.5 inches from the central tube 52, and central tube 52 is approximately 5.75 inches in diameter. The front support 110 is attached to one end of a push rod 34, and the cutters and rear rollers support are built around this push rod. The wheels 114 are made of aluminum (standard 6061-T6), with a diameter of 2 inches and thickness of ⅞ inches. Spring 116 is a spring-tempered steel jumbo compression spring, 6 inches in length, 3.656 inches outer diameter, 0.375 inches wire diameter, with a maximum load of 550.00 lbs and a rate of 161.00 lbs/inch (stroke 3.37 inches). In this embodiment, when fully collapsed, the Front Support 110 fits within the cutting diameter of the smallest of cutting wheels 92. The collapsible arms 112 including first member 115 and second member 113 are made of 1 inch thick stainless steel conforming to AISI 1020, the length of the first arm 113 (attached to wheel 114) is 7.675 inches (centre to centre) and the length of the second arm 115 is 5.5 inches centre to centre, with the distance from connection 119 to connection 121 being 4.050 inches in length. In this embodiment, the wheels 74 and the wheels 114 are made of aluminum (standard 6061-T6), with a diameter of 2 inches and thickness of ⅞ inches. The wheels 74 are biased outwards by a type 302 stainless steel compression spring 3.00 inches length, 0.500 inches outer diameter and 0.080 inches wire diameter, with a maximum load of 56.91 lbs and a rate of 40.65 lbs/inch (stroke 1.4 inches). As a result, in this embodiment the front support 110 is more flexible than the rear rollers support 70.

In this embodiment, the cutter wheels 96 are made of steel (standard SAE 1045 mild steel, hardness 28-32 Rc) and have a 0.5 inches thickness. For removing a liner from a 16 inch pipe, the diameter of the largest cutter is 15.25 inches; the cutter wheel has a diameter of 14.75 inches, with a 0.625 inch allowance for inserts, and the insert tips 98 are standard carbide triangle-shaped inserts ¾ inch long. In this embodiment for use with a 16 inch conduit, the diameters of the cutters including inserts is 15.25 inches, 14.75 inches, 12 inches and 10.5 inches; the diameters of the corresponding cutter wheels are 15 inches, 13.5 inches, 12 inches and 10.5 inches.

In another embodiment, the smallest size cutting wheel can have two carbide inserts instead of one to accommodate variations in the in-pipe obstacles.

In another embodiment, the set of cutters 90 are sized so the smaller cutters cut inside of the cutting diameter of the carbide inserts of the next biggest cutting wheel.

In one embodiment, a steel cable is attached to the front support and threaded through the conduit before operation. If one of the push rods breaks, the liner removal system can be removed from the host conduit by pulling the device out using the steel cable, although this may well damage the device.

In the case of very short conduits (i.e. less than 10 m), it may be possible to run the liner removal system without the rear slide supports.

Although the forgoing description and accompanying drawings relate to specific preferred embodiments of the present invention as presently contemplated by the inventor, it will be understood that various changes, modifications and adaptations may be made without departing from the spirit of the invention.

What is claimed is:

1. An apparatus for removing a liner from a generally cylindrical conduit, comprising:
   a front support axially displaceable inside a conduit provided with a first guide means engagable with the inner periphery of said conduit;
   wherein the front support comprises at least three collapsible supports oriented radially to the axis of the conduit, said collapsible supports being attached to a sliding ring, said sliding ring being biased by a spring to extend said collapsible supports, and where the three collapsible supports have greater radial flexibility than the at least three spring-loaded rollers;
   a shaft extending axially from said front support;
   a rear support axially displaceable inside a conduit supporting said shaft provided with a second guide means engageable with the inner periphery of said conduit;
   wherein the rear support includes at least three spring-loaded rollers oriented radially to the axis of the conduit and wherein the spring-loaded rollers include wheels oriented axially down the pipe;
a set of cutters mounted on said shaft for rotation about the axis of said conduit and mounted between said front support and said rear support;
drive means for rotating said set of cutters about said axis and pushing said shaft down the conduit where the drive means provides at least 1000 ft lbs of torque; and
at least one third support for the shaft located between said driver and said rear support.

* * * * *